FIG. 2A

United States Patent Office 3,249,917
Patented May 3, 1966

3,249,917
ERROR DETECTION APPARATUS FOR AUTO-
MATIC DATA COLLECTION SYSTEM
George J. Yagusic, Litchfield, Conn., assignor, by mesne assignments, to Control Data Corporation, Minneapolis, Minn., a corporation of Minnesota
Filed Dec. 29, 1961, Ser. No. 163,153
16 Claims. (Cl. 340—146.1)

This invention relates to a system and apparatus for automatic data collection. More particularly, the invention relates to improving the error-detecting capability of an automatic data collection system.

The system and apparatus of the present invention is preferably incorporated into the automatic data collection system and apparatus disclosed in my copending application, Serial No. 863,227, filed December 31, 1959, entitled "System and Apparatus for Automatic Data Collection," said application having been filed by myself, George J. Yagusic, as coinventor with John F. Carragan and Andrew C. Reynolds, Jr. The present application is a continuation-in-part of application Serial No. 863,227, and is assigned to the same assignee as the earlier-filed application.

The automatic data collection system of the above-identified copending application may be used, for example, in factories where a plurality of data transmitters may be installed in different areas, shops, or departments, for transmission of manufacturing data to a central receiver-recorder which may be located in a central accounting office. Such data may include, for example: the number of units manufactured on particular machines; the designated job orders filed by machine operators; the identity and hourly wage rates of the machine operators; the total time required for each operation, etc. Alternatively, the apparatus of the invention may be used in warehouses and distribution centers for collection of order receipt and delivery time information for inventory control purposes, or in department stores for automatic collection of point of origin sales data, etc.

In a large factory, for example, there is, at present, a great deal of paper work required to be done in the various shops and departments, including such handwritten reports as time tickets for payroll entries, production and inventory control records, cost accounting, quality control inspection and scheduling reports, etc. For automatic central office computing, this mass of data now has to be individually punched into cards by manual operations, and the punched cards have to be verified by human operators before they can be fed to tabulating or computer apparatus. Various systems which have heretofore been suggested for expediting the flow of this information into a central office have included the use of closed-circuit television, which introduces the added problem of human error in reading the data from a TV screen, and the use of intercommunicating telephone circuits, which frequently results in error from misunderstanding of the verbally relayed information. In these prior art systems, the multiplicity of personnel involved results in divided responsibility, which is quite undesirable.

The principle of the data transmission and collection system of the present invention and the above-identified copending application is to capture the required information at the point of origin, select, sort, and collate it automatically and substantially instantaneously, and then to transmit infallibly the desired data to a central receiver-recorder where it is permanently punched onto tape and recorded on some other common language medium which can be fed directly into an automatic computer without further intervention or possibility of human error.

The system and apparatus disclosed in the above-identified copending application is related to the system and apparatus disclosed in United States Patent No. 2,918,654 of Curtis Hillyer entitled "Automatic Information Transmission," which patent issued December 22, 1959, to the assignee of the present application.

United States patent application Serial No. 841,926, filed September 21, 1959, entitled "Data Transmission Apparatus," discloses a typical transmitter of the system disclosed in the above-mentioned United States application Serial No. 863,227. Andrew C. Reynolds, Jr., Oliver H. Chalker, Jr., John F. Carragan, and Edward J. Gutowski are the applicants in Serial No. 841,926, and this application is also assigned to the assignee of the present application. Reference should be had to the above applications and patent for details of the operation of the data collection system not important to the invention herein disclosed.

FEATURES

The error-detection system and apparatus of the present invention includes the following features:

The characters of the messages transmitted and recorded are transmitted at a predetermined fixed rate. For each class of messages transmitted to and recorded by the central receiver-recorder, a "length-of-message" character is provided by the transmitter to the central receiver-recorder. This length-of-message character has a numerical value corresponding to a fixed number of characters.

The characters received and recorded by the receiver-recorder are counted, and at the end of the message, the number of characters is compared with the length-of-message character, and if they differ, an error signal is provided for the system.

However, correctly transmitted messages of a given class having the same length-of-message character may differ in the number of characters actually transmitted. The resulting spaces in the messages are restricted to fields which are preceded by a "start-of-field" character and ended by an "end-of-field" character.

Character recognition means are provided in the receiver-recorder to recognize the start-of-field and end-of-field characters.

Means are provided for recording space characters when spaces (i.e. no character) occur in a message after recognition of the start-of-field character.

Whenever a message is being transmitted, a message indicating signal is transmitted to the central receiver-recorder.

Characters of a message occur in blocks, and when a block of characters is being transmitted, a character indicating signal is provided for the central receiver-recorder.

Generation of the space characters is terminated upon receipt of the end-of-field character, or termination of the message or character indicating signals.

The character recognition circuits are flexible in that the start-of-field and end-of-field characters to be recognized may be easily changed by manually setting switches.

Other features of the invention will become apparent from a consideration of the following specification.

PRIOR ART

As described in detail under the heading "The length-of-Message Monitor Unit" of my above-identified copending application, Serial No. 863,227, there is transmitted in this system, along with each message received and recorded at the receiver-recorder, a length-of-message character which corresponds to the number of characters which should be received and recorded at the receiver-recorder. A length-of-message monitor unit is provided which compares the the length-of-message signal with the actual number of characters recorded. If they differ, an error signal is provided for the system.

As further described in my copending application, the messages transmitted by the system comprise characters recorded on punched cards or other "data carriers." In many instances, these data carriers may not have characters recorded thereon wherever possible, but may contain some blank spaces. As described in my copending application under the heading "The Sync Insertion Unit," a synchronous signal generator is provided at the receiver-recorder which causes space characters to be recorded whenever spaces occur on the data carriers. Thus, the length-of-message monitor unit will count these spaces as well as the actual number of characters transmitted.

As a consequence of this, certain kinds of errors may occur in a message and yet not be detected by the length-of-message monitor unit. For example, if a character recorded on a punch card is not read by a data transmitter and thus not transmitted to the receiver-recorder, the sync insertion unit will cause a space character to be recorded and counted by the length-of-message monitor unit. Thus, even though the message has varied in the number of characters actually transmitted, this error has not been recognized.

Such undetected errors may be eliminated by insuring that a character is recorded wherever possible on the punched cards or other data carriers used in the data collection system and dispensing with the space insertion function. In many instances, however, this is not practical. For example, one kind of card accepted by data transmitters of the system is called a job card. This kind of card often records a part number which commonly requires the same number of characters for any part. This presents no problem. However, often characters indicating a series of manufacturing or other operations is also recorded on the same card. Each character may, for example, indicate one operation. Therefore, on job cards for parts requiring a single operation, only one character will be recorded, whereas on cards for parts requiring moe operations, more characters will be recorded. That is, if three operations are required, three characters are required. If the maximum number of operations for a certain class of job cards is ten, then ten consecutive character positions must be reserved on a job card to indicate these operations. Such a reserved area is called a field. If there are only two operations required for a particular job card, then there will be eight blank spaces in the "operation field" of that card.

Although so-called space characters can be recorded in the remaining eight spaces, to do this often would require repunching of literally tens of thousands of cards in a customer's present supply, or extensive modification of a customer's other data processing equipment not previously programmed to accept such space characters. The system and apparatus of the present invention makes it possible for the data cards to continue to have blank spaces on them, but reduces to a minimum the number of undetected errors resulting therefrom.

OBJECTS

It is therefore an object of the invention to greatly increase the accuracy of error detection in data collection systems.

Another object of the invention is to provide for messages to be transmitted in such a data collection system, each having an over-all fixed number of characters but having special fields wherein the number of characters may vary.

A further object of the invention is to provide means in a receiver-recorder of a data collection system of the above character for generating characters when no characters are received during reception of the said fields.

Still another object of the invention is to provide means in a data collection system of the above character for signaling the beginning of such a field.

A still further object of the invention is to provide means in such a data collection system for signalling the end of such a field.

Another object of the invention is to provide in a data collection system of the above character a special character recognition device.

A further object of the invention is to provide such a character recognition device characterized by the ease with which the character to be recognized may be chosen.

A still further object of the invention is to provide apparatus accomplishing the above objects employing circuitry characterized by simplicity, low cost, durability, and reliability.

Other objects of the invention will in part be obvious and will in part appear hereinafter.

The invention accordingly comprises the means and features of operation and combinations of functions, and the relation of one or more of such operations and functions with respect to each of the others of the system; and the apparatus embodying features of construction, combinations of elements and arrangements of parts which are adapted to effect such operations and functions, all as exemplified in the following detailed disclosure, and the scope of the invention will be indicated in the claims.

FIGURES

For a fuller understanding of the nature and objects of the invention, reference should be had to the following detailed description, taken in connection with the accompanying drawings, in which:

FIGURE 2, comprising FIGURES 2A and 2B, is a circuit diagram, partially in block form, of the character recognition circuits of FIGURE 1;

Similar reference characters refer to similar elements throughout the several views of the drawings.

GENERAL DESCRIPTION

Generally, the present invention is applicable to data transmission systems such as that disclosed in the above-identified copending application, Serial No. 863,227, wherein messages are transmitted from a data transmitter to a data receiver on a character-by-character basis at a fixed character rate. Each message comprises characters from one or more data carriers, such as punched cards, and characters derived from manually settable elements, such as dials, switches, or a keyboard. The method of programing of the present invention comprises grouping together the places where spaces occur (i.e. where no characters are recorded on the data carriers to be used in the system) into a special field. The field is always preceded on the data carried by a start-of-field character and, in many instances (e.g. when the field does not continue to the end of the data carrier), the field is terminated by an end-of-field character.

Apparatus of the present invention comprises circuits in the receiver-recorder for recognizing the start-of-field and end-of-field characters and for thereupon providing a start and a stop signal, respectively.

The start signal activates a novel space insertion unit which, through regeneration (disclosed in detail in my copending application Serial No. 863,227), causes space characters to be recorded by the receiver-recorder of the system when no characters are received during transmission of the special field. Means are provided for inhibiting operation of the space insertion unit when characters are received during transmission of the special field and for inhibiting recording of the start-of-field and end-of-field characters.

The stop signal deactivates the space insertion unit. The unit is also deactivated by the termination of the message and character gating signals provided by the transmitters of the system.

In general, a character recognition circuit of the invention comprises a negative and a positive gate. Each of these gates comprises a plurality of diodes. The input terminals of these gates are connected by double pole-signal throw switches to the data lines of the system. By setting the switches, any desired character of the system code may be recognized.

THE DATA COLLECTION SYSTEM

Figures 1, 1A:
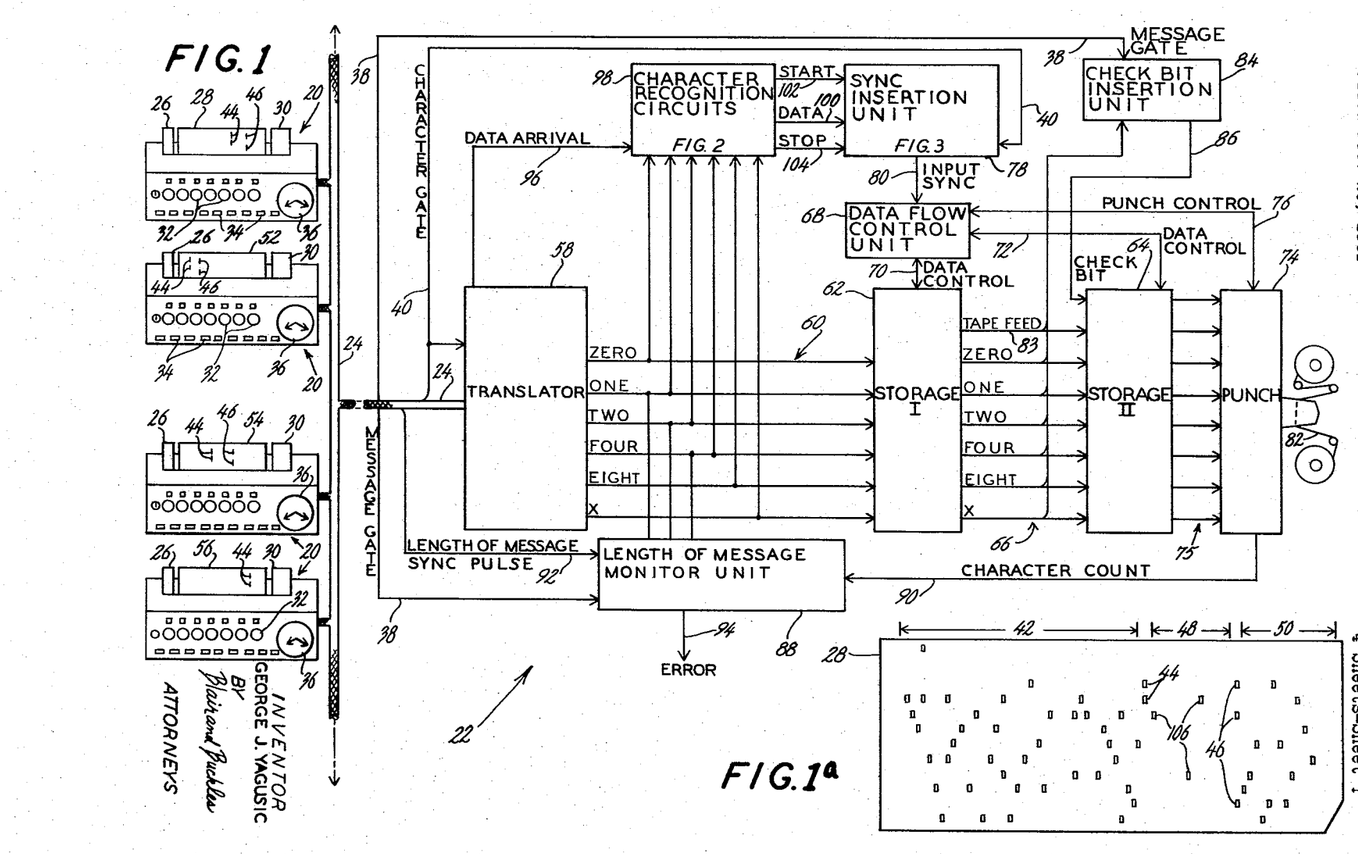
FIGURE 1 is an over-all block diagram of the preferred embodiment of the system and apparatus of the present invention.
FIGURE 1a is a plan view of a data card having a special field recorded thereon for a varying number of characters as provided for by the system and apparatus of FIGURE 1.

More specifically, referring to FIGURE 1, the system of the present invention comprises a plurality of data transmitters 20. The data transmitters are connected to a central receiver-recorder (generally indicated at 22) by a common parallel communications cable 24. Each data transmitter 20 is capable of accepting a plurality of punched cards; for example, punched cards 26, 28, and 30. Data card 26 may be an identification card having recorded thereon by punches a number identifying the operator sending the message. Data card 28 may be a job card identifying the manufacturing, inventory or other opertion being reported; and data card 30 may be a location or machine card identifying the place at which the inventory transaction occurred or the machine used to perform a manufacturing operation.

Each data transmitter 20 has a plurality of variable dials 32. These are set by the operator prior to transmitting a message to indicate such variable information as the number of units produced, the number of units affected by the inventory change, or the like. Indicator lights 34 and a clock face 36 are also provided on the data transmitters 20 for the convenience of the operator.

The detailed construction and operation of the data transmitters 20 is described in the above-identified copending applications Serial Nos. 841,926 and 863,227. As described in these applications, during the transmission of a message, the data transmitter 20 transmitting the message provides to the central receiver-recorder 22 a message gate signal on a message gate conductor 38. During the transmission of each group or field of characters in a message, the transmitter also provides a character gate signal on a character gate conductor 40.

Now referring to FIGURE 1a, the job card 28, according to the present invention, comprises a first field 42 containing information recorded with a fixed number of characters such as a job number, contract number, or the like. A start character 44 and stop character 46 are recorded on the card. These special characters denote the beginning and end of a special field 48 wherein a variable number of characters may appear denoting such information as the operations to be performed on the particular job. The final field 50 of the card 28 again contains a fixed number of characters, such as the account number to which the operations performed are to be charged.

Again referring to FIGURE 1, another job card 52, according to the present invention, may have the start-of-field character 44 and end-of-field character 46 recorded at different positions on the card. Another job card 56 may have only the start-of-field character 44 recorded thereon in which case the special field extends to the right-hand edge of the card 56.

Still referring to FIGURE 1, the messages transmitted by the transmitters 20 are transmitted on a character-by-character parallel basis over the common communications cable 24. In the present embodiment of the invention, the characters are transmitted in a twelve-channel code. This is the same Hollerith code in which characters are recorded on the punched cards. The characters are transmitted at a fixed rate of one character each 18 milliseconds and each character is transmitted for a 9 millisecond period.

The characters, as received by the receiver 22 are translated by a translator 58 which is connected to the communications cable 24. The translator, in the embodiment of the invention shown in FIGURE 1, translates each character from the twelve-channel Hollerith code to a six-channel code suitable for recording on punched tape. Data lines 60 connected to the translator are grounded to indicate the presence of an information bit in the respective channels. The characters are then stored temporarily in a buffer storage unit comprising a first storage stage 62 and a second storage stage 64. Each storage stage 62, 64 is capable of storing a single character. The two storage stages 62 and 64 are connected together by a second set of data lines 66. The storage of characters in each storage stage and the transfer of characters from storage I, 62, to storage II, 64, is controlled by a data flow control unit 68 as indicated by the data control lines 70 and 72. The characters are then transferred to a punch 74 over data lines 75. This operation is also under control of the data flow control unit 68, as indicated by the punch control line 76.

The data flow control unit 68 is controlled by a synchronizing unit 78, hereinafter called the "sync insertion unit." This unit supplies to the data flow control unit 68 input synchronization pulses ("input sync") on input sync line 80. Upon receiving an input sync signal on line 80, the data flow control unit 68 sets a tape feed storage unit in storage I and causes data bits of the character presented by the translator 58 on the data lines 60 to be stored in the other storage units of storage I. If at this time no character is stored in storage I, the character, together with an indicating signal on tape feed line 83, is transferred to the storage units of storage II. Upon a punch request signal on line 76, the character stored in storage II is transferred to the punch 74 and recorded on the punched tape 82 as described in greater detail in my above-identified copending application, Serial No. 863,227.

The central receiver-recorder 22 includes a check bit insertion unit 84 which monitors data lines 66. If a message gate signal is present on message gate line 38, the check bit insertion unit 84 provides a signal on check bit line 86 to set a check bit storage unit in storage II when an even number of information bits are presented on data lines 66. When no information bits are present on data lines 66, the check bit insertion unit treats this as an even situation. Thus, an odd number of information bits are recorded on the punched tape 82 regardless of the character recorded. This odd "parity" can be used as a check on the punching operation when the tape is read at a later time. As described in my copending application, Serial No. 863,227, the central receiver-recorder may also include a parity monitoring unit (not shown herein) to directly check the operation of the punch circuits.

The central receiver-recorder further comprises a length-of-message monitor unit 88. This unit receives a character count signal on a character count line 90 from the punch 74 each time a character is recorded on the punched tape 82. The length-of-message monitor unit 88 is also connected to the message gate line 38 and to a length-of-message synchronization pulse line 92. A length-of-message synchronization pulse is transmitted from the data transmitters 20 over line 92 at the end of each message. At this same time, a length-of-message character is transmitted over the communications cable 24. This character is translated by translator 58 on the ONE, TWO and FOUR data lines 60. These data lines are monitored by the length-of-message monitor unit 88.

The length-of-message character transmitted is equal to the number of characters that should have been transmitted during the message on a modulus eight plus one basis. This counting system is explained in detail in my copending application Serial No. 863,227. The length-of-message monitor unit 88 compares this number with the number of characters actually recorded, also on a modulus eight plus one basis. If the two numbers differ the length-of-message monitor unit 88 produces an error signal on an error conductor 94. Error, special function and control circuits (not shown) then take appropriate action as also described in my copending application.

Except for the special start-of-field and end-of-field characters 44 and 46, recorded on the data cards, the above specifically described elements and system of FIGURES 1 and 1a are the same as and operate in the same manner as the system and apparatus of FIGURE 4 of my above-identified copending application, Serial No. 863,227. Reference should be made to that application for a detailed description of the system and apparatus above described in general terms.

In the invention of the present application, the sync insertion unit 78 is connected to character gate line 40. The translator 58 produces a data arrival signal on a data arrival conductor 96 upon receipt of each character transmitted from a transmitter 20 if a character gate signal is present on character gate conductor 40. In the former application, the data arrival signal on conductor 96 was supplied directly to the sync insertion unit 78 wherein it was used to control the generation of input synchronization signals on input sync conductor 80.

In the present invention, the data arrival conductor 96 is connected to a character recognition circuit 98 which monitors the data lines 60. The character recognition circuit produces data signals on data conductor 100. Each data signal is derived from the data arrival signals on conductor 96 as explained in detail below under the heading "Character Recognition Circuits."

The character recognition circuits 98 also recognize the start-of-field character 44 and end-of-field character 46 when they are received. Upon recognition of the start-of-field character 44, the character recognition circuit 98 produces a start signal on start conductor 102 and, upon recognizing the end-of-field character 46, produces a stop signal on stop conductor 104. These signals are supplied to the sync insertion unit 78 which produces an input synchronization signal wherever a data signal is supplied to it. The sync insertion unit also automatically produces an input synchronization signal once each 18 milliseconds after receipt of a start signal on conductor 102. These self-generated synchronization signals are discontinued upon the receipt of the stop signal on conductor 104 or upon discontinuance of the character gate signal on conductor 40.

Thus, the sync insertion unit 78 performs two functions. It provides an input synchronization signal on conductor 80 which controls the flow of characters through the buffer storage units 62 and 64 and the recording of these characters on punched tape 82. The unit also produces input synchronization signals on conductor 80 automatically each 18 milliseconds after receipt of the start signal on conductor 102. Each input synchronization signal causes the data flow control unit 68 to set the tape feed storage element of storage I. When this signal is set into storage II on line 83, the check bit insertion unit 84 recognizes an even situation (i.e., no data bits on data lines 66) and sets the check bit storage unit of storage II. This results in a check bit being recorded on the punched tape 82, although no character has been received by the receiver-recorder 22.

As will be described in detail under the heading "The Sync Insertion Unit," if a character is received, after receipt of a start signal by the sync insertion unit 78, that character will be recorded in the usual manner. No input sync signal is produced by the sync insertion unit 78 upon receipt of the start-of-field and end-of-field characters and they are not recorded.

Thus, when punched card 28 of FIGURE 1a is read and the characters recorded thereon transmitted to the central receiver-recorder 22, receipt at the central receiver-recorder of the start character 44 causes the sync insertion unit 78 to initiate a "space insertion" function. The three characters 106 recorded in the special field 48 will be recorded, and check bits will be recorded between the characters 106 where no characters are recorded on data card 28. In this manner, although the number of characters recorded in the field 48 may vary, the number of characters including check bits recorded on the tape 82 for each data card such as data card 28, will be the same. Thus, the character count provided to the length-of-message monitor unit 88 will not vary. Furthermore, the space insertion function will be limited to the periods during which the special field 48 is transmitted. It wll not be effective during the transmission of the fields 42 and 50 or transmission of the variable characters in a message.

Thus, if no character is read from a data card 28 during reading of fields 42 or 50 or a character is not transmitted corresponding to a required variable dial setting (which would be errors), no character will be recorded on the punched tape 82 and no character count signal will be provided to the length-of-message monitor 88. At the end of the message, the number of characters counted and the length-of-message character will be in disagreement. The length-of-message monitor will then provide an error signal on conductor 94. This error signal can then be utilized by error, control, and special function circuits (not shown) in the manner fully described in my above-identified copending application Serial No. 863,227, to notify the transmitting transmitter that an error has occurred and to record an error character on the punched tape 82.

THE CHARACTER RECOGNITION CIRCUITS

Figures 2, 2B:
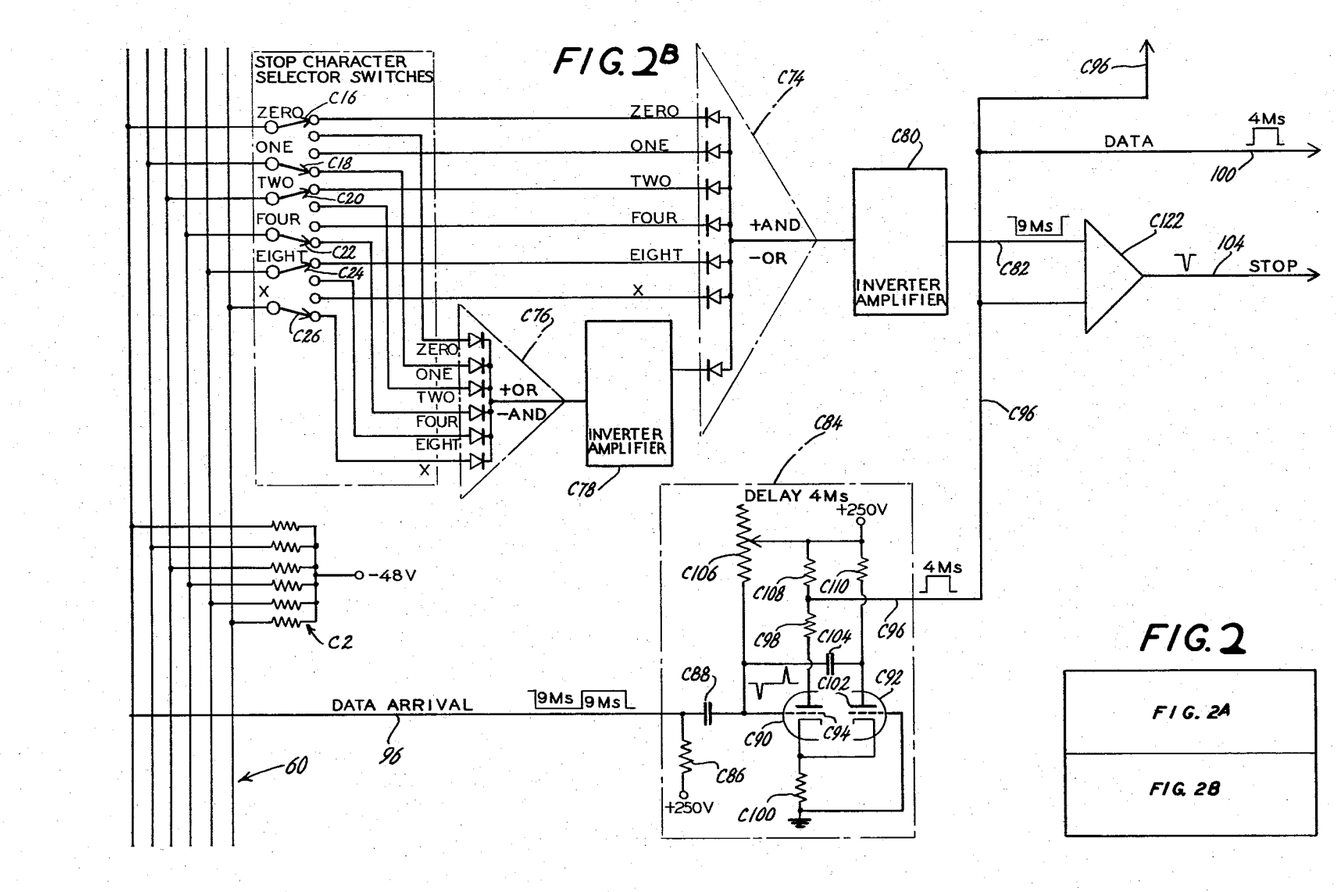
Figure 2A:
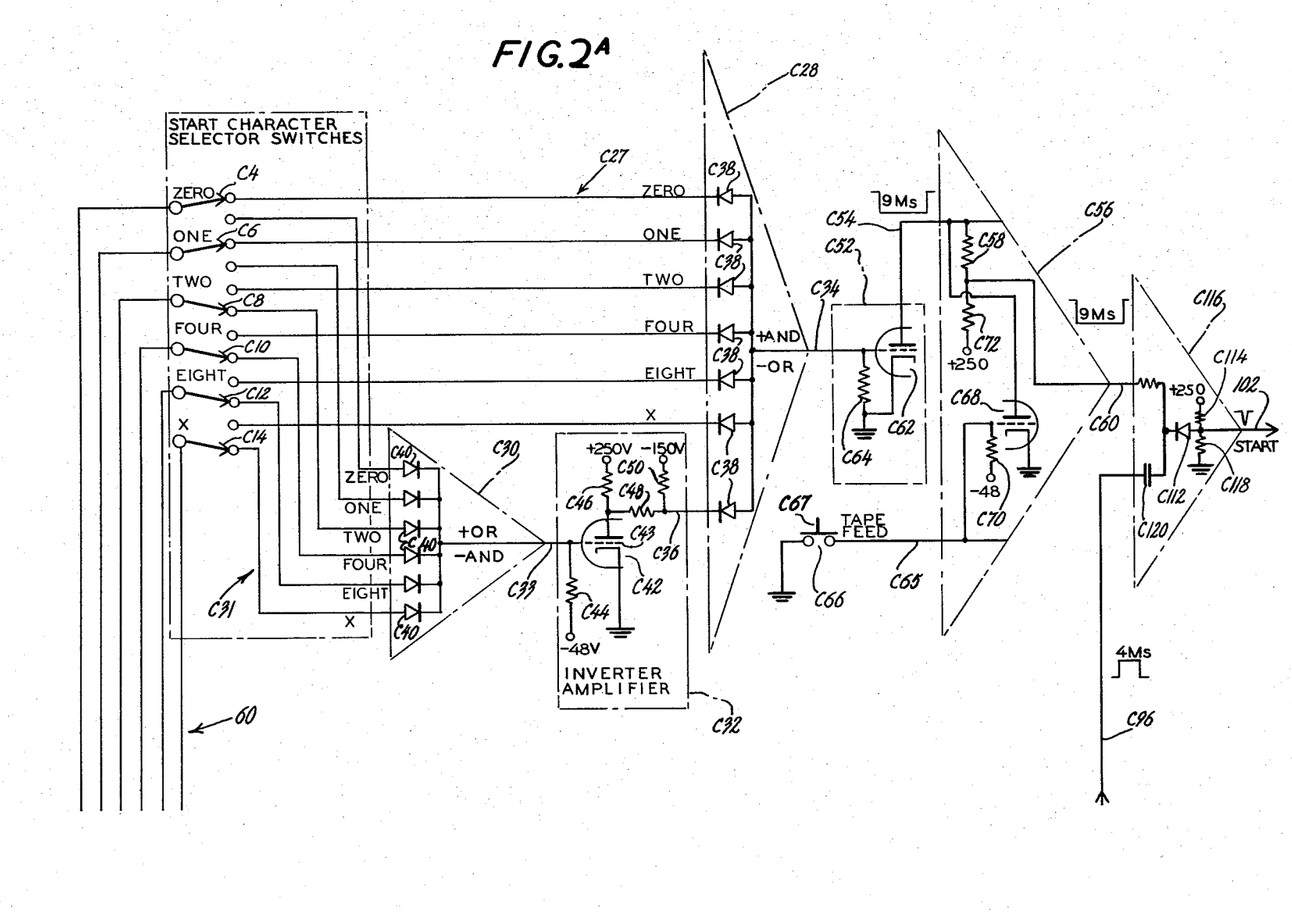

The character recognition circuits 98 of the present invention are shown in detail in FIGURE 2, comprising FIGURES 2A and 2B. FIGURES 2A and 2B may be joined together to form FIGURE 2 in the manner indicated in FIGURE 2a. As shown in FIGURE 2B, each of the data lines 60 is biased at −48 volts D.C. through one of a plurality of 10 kilohm±5%, ½ watt resistors C2. Each of the data lines 60 is connected to a plurality of start selector switches C4, C6, C8, C10, C12, and C14 (FIGURE 2A), and to a plurality of stop character selector switches C16, C18, C20, C22, C24, and C26 (FIGURE 2B).

Now specifically referring to the start character selector switches of FIGURE 2A, each of the switches is a transfer switch which, in its upward position—as are switches C4 and C6—connects its respective data line 60 to conductors C27 connected to a gate C28. A switch in the downward position—as are switches C8, C10, C12 and C14—connects its data line to a gate C30 over conductors C31. The gate C30 supplies an output signal to an inverter amplifier C32 on conductor C33. Inverter amplifier C32 inverts this signal and supplies the inverted signal to the gate C28 on conductor C36.

Gate C28 is a negative OR gate. That is, if any of its input conductors C27 or C36 are biased at −48 volts D.C., its output conductor C34 will be biased at −48 volts D.C. Conversely, as is well known to those skilled in the art, gate C28 is a positive AND gate. That is, if all of its input conductors C27 and C36 are at ground potential the output conductor C34 will be at ground potential.

Gate C30 is a positive OR gate—a positive signal (ground) to any of its input terminals C31, will produce a positive output (ground) on conductor C33. Gate C30 is also a negative AND gate—all of its input terminals must be biased at −48 volts to produce a negative output (−48 volts potential) on conductor C33.

The presence of an information bit on the data lines 60 is indicated by ground that line (not shown) in the translator 58. Thus characters containing a bit in the ZERO channel are indicated by a ground on the ZERO data conductor 60. This ground is supplied to the ZERO input terminal of gate C28. In the same way when a ground is present on the TWO data conductor, a ground is supplied to the TWO input terminal of gate C30.

Gate C28 will produce a positive output signal on conductor C34, if, and only if, all of the data lines connected to it by means of the start character selector switches are grounded and if, simultaneously, inverter amplifier C32 provides a positive output (ground) on conductors C36. Inverter amplifier C32 will only produce a positive output on conductor C36 if all of the data lines C31 connected to gate C30 are negative, that is, biased at −48 volts.

The start character, which will be recognized, i.e., produce a positive output on conductor C34 when the start character selector switches are in the positions shown in FIGURE 2A, consists of a data bit in the ZERO and ONE channels and no data bit in any of the other channels. This is the start character 44 of data card 28 shown in FIGURE 1a.

During receipt of start character 44, presence of grounds on the ZERO and ONE data lines 60 will produce a positive input on the ZERO and ONE inputs to gate C28. Since the other inputs (TWO, FOUR, EIGHT and X) to gate C28 are not connected to any data line, the circuit of gate C28 will act as though those inputs did not exist. The −48 volts bias on the TWO, FOUR, EIGHT and X data lines 60 will be applied to the connected inputs of gate C30. The resulting negative output (−48 volts) of gate C30 will cause inverter amplifier C32 to produce a positive output (essentially ground potential) on input conductor C36 of gate C28. Thus input conductors C27 and C36 of gate C28 will all be grounded and gate C28 produces a positive output (ground) on output conductor C34.

When other characters are presented on the data lines 60 either the ZERO or ONE data conductors will not be grounded or a ground will be present on at least one of the TWO, FOUR, EIGHT, or X data lines. Therefore, either the ZERO or ONE input conductor of gate C28 will be biased at −48 volts and the output signal on conductor C34 will be negative (i.e., biased at −48 volts) or a ground on one of the input conductors C31 of gate C30 will produce a ground on its output conductor C33. This will be inverted by inverter amplifier C32 to produce a negative signal (−48 volts) on conductor C36 thereby producing a negative output on conductor C34. Thus, the signal on conductor C34 will be positive (ground potential) if and only if the data conductors connected to the switches in the upward position (e.g., C4 and C6) are both grounded and those connected to the switches in the downward position (e.g., C8, C10, C12 and C14) are bias negative. Therefore, one and only one character will produce the desired positive output on conductor C34. The dodes C38 of gate C28 and diodes C40 of gate C30 are all type 1N39B germanium.

Inverter amplifier C32 comprises a grid controlled triode C42. The grid C43 is connected through resistor C44 to a source of −48 volts D.C. potential. If conductor C33 is negative, i.e., at substantially −48 volts potential, triode C42 will not conduct. Output conductor C36 will then be substantially at ground potential due to the voltage dividing action of the series connected resistors C46, C48 and C50 connected between supplies of +250 volts and −150 volts D.C.

When conductor C33 is at ground potential, triode C42 will conduct. Through the dividing action of resistors C48 and C50, output conductor C36 will be at a negative potential—about −48 volts. In this manner the signal on conductor C33 is inverted and amplified on conductor C36.

Triode C42 of inverter amplifier C32 is one-half of type 5963. Grid bias resistor C44 is 470 kilohms. Plate resistor C46 is 94 kilohms. Divider resistor C48 is 1 megohm. Divider resistor C50 is 750 kilohms. All resistors are ±5% rated at ½ watt.

When the start character selected by positioning the start character selecter switches is recognized, the positive signal (ground) on conductor C34 causes a second inverter amplifier C52 to produce a relatively negative signal (in this case ground potential) on conductor C54. The potential on conductor C54 is normally at +250 volts by virtue of the +250 volt supply applied through resistors C72 and C58. This relatively negative signal lasts as long as the character is present. In the embodiment of the present invention, this is for 9 milliseconds. Conductor C54 is the first input of a negative OR gate C56. The 9 millisecond relatively negative signal on conductor C54 passes through resistor C58 to the output conductor C60 of OR gate C56. When conductor C34 is at −48 volts potential, triode C62 of inverter amplifier C52 will not conduct and output conductor C54 will be at +250 volts potential.

Triode C62 is one-half of a type 5963. Grid biasing resistor C64 is 470 kilohms ±5% rated at one-half watt.

The second input conductor C65 of negative OR gate C56 is connected to a tape feed switch C66. When the tape feed switch C67 on the front of the receiver-recorder is depressed, ground is supplied to the second input C65 of negative OR gate C56. This ground causes normally cut off triode C68 of negative OR gate C56 to conduct, thus presenting a relatively negative signal on the output conductor C60. Thus, there will be a relatively negative signal on the conductor C60 if a start character has been recognized or if the tape feed button is depressed.

Triode C68 is also one-half of a type 5963. Grid biasing resistor C70 is 470 kilohms. Resistors C58 and C72 are each 47 kilohms. All resistors of OR gate C56 are ±5% and rated at ½ watt. All votages shown are D.C.

Now referring to FIGURE 2B, stop character selector switches C16, C18, C20, C22, C24, and C26 operate in the same manner as the start character selector switches of FIGURE 2A. As shown in FIGURE 2B, they are positioned to recognize a character consisting of a bit (ground) on the ZERO, TWO and EIGHT data lines. Thus, they are positioned to recognize the end-of-field character 46 of FIGURE 1a.

Gates C74 and C76 connected to the stop character selector switches perform the same functions in recognizing the stop character as gates C28 and C30 perform in recognizing the start character. Gates C74 and C76 are connected to the stop character selector switches in the same manner that gates C28 and C30 are connected to the start character selector switches. The circuits of gates C74 and C76 are identical to the circuits of gates C28 and C30.

The circuit of inverter amplifier C78 is identical to the circuit of inverter amplifier C32. Inverter amplifier C78 is connected between gate C76 and gate C74 in the same manner as inverter amplifier C32 is connected between negative gate C30 and gate C28.

An inverter amplifier C80 is connected to gate C74. The circuit of inverter amplifier C80 is identical to the circuit of inverter amplifier C52.

Thus, a relatively negative signal of 9 milliseconds duration is present on output conductor C82 of inverter amplifier C80 whenever the stop character as selected by the position of the stop character selector switches, is present on data lines 60.

The characters transmitted to the central receiver-recorder in the system of the present invention are sent at a regular rate, one each 18 milliseconds, and are presented on the data lines for a period of 9 milliseconds. Therefore, the data arrival signals derived by the translator 58 and presented on data arrival conductor 96 (FIGURE 2B) consist of a relatively negative signal of 9 milliseconds duration, indicating the presence of data, and a relatively positive signal of 9 milliseconds duration, indicating the spaces between characters.

Still referring to FIGURE 2B, data arrival conductor 96 is connected to a 4 millisecond delay circuit C84. Resistor C86 and capacitor C88 connected to conductor 96 differentiate the data arrival signal.

Delay C84 further comprises a pair of triodes C90 and C92 connected in circuit to form a monostable, one-shot multivibrator. The grid C94 of triode C90 is normally biased positive through resistor C106 and C90 is normally conducting. Output conductor C96 connected to the plate of C90 through plate resistor C98 is therefore normally at a relatively negative level somewhat above ground potential as compared to approximately +250 volts when triode C90 is non-conducting. Since the cathodes of triodes C90 and C92 are connected together and to ground through cathode resistor C100, triode C92 will be cut off when triode C90 is conducting.

The derivative of the negative going portion of the data arrival signal—a negative pulse—supplied to grid C94 causes triode C90 to cut off, that is, to no longer conduct. The cathodes of the two tubes C90 and C92 then become substantially grounded, and this causes triode C92 to conduct. The plate C102 of triode C92 is then at a relatively negative potential as compared to approximately +250 volts when triode C92 is nonconducting, and this potential is transferred through capacitor C104 to the grid C94 of triode C90. Thus, triode C90 will continue to be cut off until capacitor C104 charges through resistor C106. Plate resistors C108 and C110 are also connected in the circuit as shown. The time it takes condenser C104 to charge is determined by its capacitance and the resistance of variable resistor C106. The resistance of C106 is adjusted such that grid C94 becomes positive enough to cause triode C90 to conduct after it has been cut off for a period of 4 milliseconds. Since triode C90 is cut off for 4 milliseconds, the output on conductor C96 will be relatively positive for 4 milliseconds, producing the square wave signal shown.

Triodes C90 and C92 are each one-half of a type 5963. Differentiator resistor C86 is 100 kilohms. Capacitor C88 is 20 micromicrofarads. Cathode resistor C100 is 4.7 kilohms; plate resistor C98 is 6.8 kilohms; resistor C108 is 18 kilohms; and resistor C110 is 150 kilohms. Capacitor C104 is .01 microfarads. Resistor C10 is approximately 2.6 megohms and is adjusted to provide the 4 millisecond delay. Resistors C100, C106 and C110 are ½ watt, ±5% resistors; while resistors C86, C98 and C108, are 1 watt, ±5% resistors.

Still referring to FIGURE 2B, output conductor C96 of delay C84 is connected to data conductor 100 and to one of two inputs of AND gate C116 (FIGURE 2A). The other input of AND gate C116 is connected to the output conductor C60 of negative OR gate C56. AND gate C116 comprises a diode C112, resistors C114, C115, C118, capacitor C120 and a source of +250 volts D.C. potential connected in circuit as shown. Diode C112 is type 1N39B germanium. Resistor C114 is 150 kilohms, resistor C117 is 150 kilohms, and resistor C118 is 150 kilohms, all are ±5%, 5 watt resistors—and capacitor C120 is 1,000 micromicrofarads.

If the relatively negative signal is present on conductor C60, and the square wave is present on conductor C96, diode C112, resistor C114, and capacitor C120 will cause the square wave to be differentiated. The initial positive differential pulse coinciding with the beginning of the square wave signal on conductor C96 will not be passed by the diode C112. The negative differential pulse coinciding with the negative going portion of the square wave on conductor C96 will pass through AND gate 116. The two coincident relatively negative signals on the two inputs of negative AND gate C116 will thus produce a negative output pulse on conductor 102, 4 milliseconds after the initial arrival of the start character. This signal is the start signal and is supplied to the sync insertion unit 78 of FIGURE 3.

In the same manner, AND gate C122, (FIGURE 2B) produces a relatively negative output pulse on stop conductor 104, 4 milliseconds after the initial arrival of the end-of-field character. The circuit of AND gate C122 is identical to the circuit of AND gate C116.

Thus it will be seen that by selectively positioning the start character and stop character selector switches any two characters may be chosen to perform these functions.

Four milliseconds after receipt of each of these characters, a start or a stop pulse will be presented on conductors 102 and 104, as appropriate. Additionally, delay C84 will produce a square wave signal on data conductor 100 which begins coincident with the beginning of the data arrival signal and ends 4 milliseconds thereafter.

THE SYNC INSERTION UNIT

Figure 3:
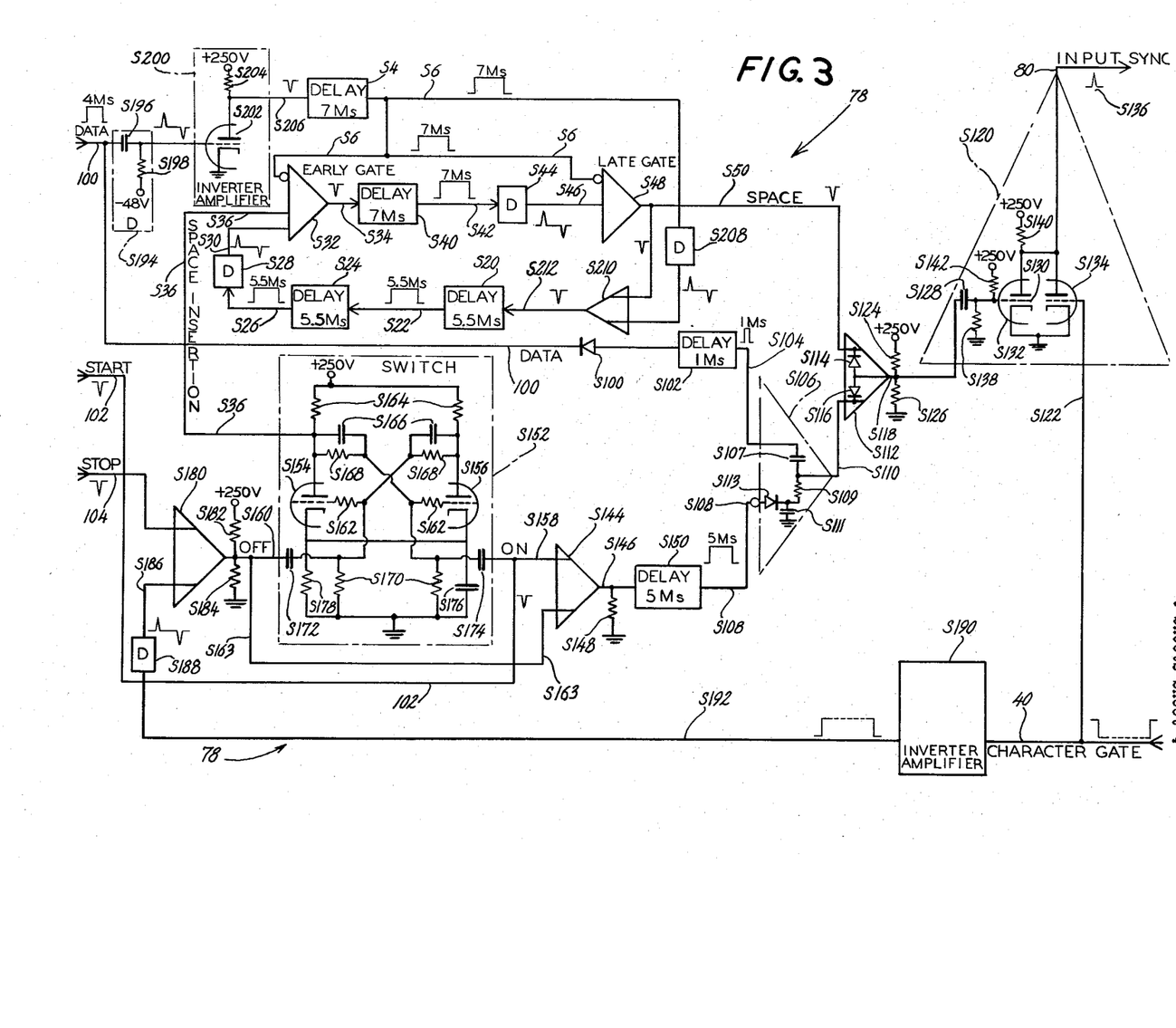
FIGURE 3 is a circuit diagram, partially in block form, of the sync insertion unit of FIGURE 1.

Now referring to FIGURE 3, the data signal on conductor 100 passes through isolating diode S100. Its negative going portion triggers a 1 millisecond delay S102 of substantially similar circuit to delay C84 of FIGURE 2B. Delay S102 produces a 1 millisecond output pulse on its output conductor S104. This pulse is supplied to an AND gate S106.

AND gate S106 comprises a 1000 micromicrofarad capacitor S107, a 150 kilohm±5% ½ watt resistor S109, a 100 micromicrofarad capacitor C111 and a type 1N39B germanium diode C113 connected in circuit as shown.

If a positive signal is not present on the second input conductor S108 of AND gate S106 (which is true in the normal situation when neither a start or a stop character has been recognized) a differential pulse will appear on conductor S110 coincident with the negative going portion of the squarewave on conductor S104. This passes through a negative OR gate S112 composed of two type 1N39B germanium diodes S114 and S116 connected back to back as shown to produce a negative pulse on conductor S118.

Conductor S118 is one input of a negative AND gate S120. The other input of gate S120, conductor S122, is connected to the character gate conductor 40. Biasing resistors S124 and S126 are connected between +250 volts D.C. and ground and to conductor S118, as shown. Conductor S118 is connected through a capacitor S128 to the grid S130 of a triode S132. The plate of triode S132 is connected to input sync conductor 80 as is the plate of a second triode S134. The grid of triode S134 is connected to the second input of AND gate S120, conductor S122. Triodes S132 and S134 are normally conducting and therefore the normal signal on conductor 80 is relatively negative (somewhat above ground potential). If only one of the triodes is cut off, no change will be noted in the signal on conductor 80 since the other triode will still be conducting. If, however, both triodes are simultaneously cut off, conductor 80 will go positive +250 volts. Therefore, if the character gate signal is present on conductor S122, triode S134 is cut off, and if the negative pulse is present on conductor S118, triode S132 is also cut off, and the positive input sync pulse S136 will be present on input sync conductor 80, as shown.

Triodes S132 and S134 are each one-half of a type 5963. Divider resistors S124 and S126 are 150 and 100 kilohms, respectively. Capacitor S128 is 1000 micromicrofarads. Grid resistor S138 is 47 kilohms; plate resistor S140 is 100 kilohms, and grid biasing resistor S142 is 1 megohm. Resistor S140 is rated at 1 watt, all other resistors are rated at ½ watt. All resistors are ± 5%. All voltages shown are D.C.

Thus, the first function of the input synchronization circuit 78, that of producing an input sync signal on conductor 80, 5 milliseconds after the initial receipt of each character is fulfilled.

The second function of the input synchronization circuit is to provide input synchronization signals each 18 milliseconds when no characters are received after receipt of a start signal on conductor 102. A negative pulse start signal on start conductor 102 is supplied to a negative OR gate S144 identical in construction to OR gate S112. The negative signal then appears on output conductor S146 of OR gate S144 across a 470 kilohm ±5%, ½ watt resistor S148 connected to ground. The signal triggers a delay S150 having a circuit identical to delay C84 of FIGURE 2B, except that the value of the variable resistor has been adjusted to provide a 5 millisecond delay. The positive output square wave of 5 millisecond duration on conductor S108 will inhibit negative AND gate S106 from passing the negative pulse on conductor S104. Therefore upon receipt of the start-of-field character at the central receiver-recorder, no input sync signal will be supplied on conductor 80. Thus, the start-of-field character will not be set into storage I of FIGURE 1, and the character will not be recorded by the punch 74.

The negative start pulse on conductor 102 is also used to set a switch circuit S152. This switch circuit S152 comprises a flip-flop—two triodes S154 and S156 connected in circuit in the well-known manner. A negative signal to input conductor C158 connected to the grid of triode S156 will cause this triode to cut off. This will cause tirode S154 to conduct producing a negative output signal on sync insertion conductor S36.

Switch S152 is turned off by a relatively negative signal on input conductor S160, as will be described below. Triodes S154 and S156 are each ½ of a type 5963. Grid resistors S162 are both 10 kilohms. Plate resistors S164 are both 33 kilohms. Coupling capacitors S166 are both 100 micromicrofarads. Coupling resistors S168 are both 470 kilohms. Grid biasing resistors S170 are both 330 kilohms. Input capacitors S172 and S174 are both 100 micromicrofarads. Cathode capacitor S176 is .005 microfarad; and cathod resistor S178 is 22 kilohms. All resistors are ±5%, and all resistors but S164 and S178 are ½ watt, S164 and C178 being all 1 watt. The +250 volt potential source shown is D.C.

When an end of field character is recognized by the stop character selector switches of FIGURE 2B, the negative signal supplied on stop conductor 104 passes through negative OR gate S180 of identical construction to gate S112. This signal is supplied to input S163 of negative OR gate S144. It therefore triggers delay S150, producing the positive output pulse on S108 to inhibit AND gate S106. Thus the termination of the signal on conductor S104 will not produce a pulse on output conductor S110 of AND gate S106. In this way, receipt of the stop character at the central receiver-recorder will not give rise to an input sync signal on conductor 80, and the stop character will not be recorded by the punch 74.

The output conductor S160 from negative OR gate S180 is biased between +250 volts D.C. and ground by divider resistors S182 and S184. S182 and S184 are both 150 kilohms, ±5%, rated at ½ watt. The signal on conductor S160 sets the switch S152 off by causing triode S154 to be cut off. This means that there is then a positive signal on conductors S36 from the switch S152.

A second input conductor S186 of gate S180 is connected to differentiator circuit S188 which in turn is connected to inverter amplifier S190. The circuit of inverter amplifier S190 is conventional and similar to that of inverter amplifier C32 of FIGURE 2A.

Inverter amplifier S190 is connected to character gate conductor 40. Thus the output of inverter amplifier S190 on conductor S192 is the inverse of the character gate on conductor 40. That is, the level of the signal on conductor S192 is positive during the character gate and negative when there is no character gate. When the level on conductor S192 goes negative, differentation circuit S188 produces a negative output pulse on conductor S186, this passes through OR gate S180 and sets switch S152 off.

In this manner, switch S152 may be turned off either by a stop signal on conductor S104 or by the end of the character gate signal on conductor 40.

The sync insertion unit 78 of FIGURE 3 includes a regenerative loop circuit for producing space signals on conductor S50 each 18 milliseconds when the space insertion signal is present on the conductor S36. This regenerative circuit is substantially the same as the regenerative circuit disclosed in FIGURE 6 of my above copending application, Serial No. 863,227, and identical elements of FIGURE 3 of the present application and FIGURE 6 of the earlier application are given the same reference characters herein.

The data square wave signal on conductor 100 is supplied to the differentiation network S194 comprising a capacitor S196 and resistor S198 connected as shown. The positive pulse portion of the output of differentiation circuit S194 supplies the input to an inverter amplifier S200 comprising a triode S202 and a plate resistor S204.

Thus a negative pulse signal occurs on conductor S206 coincident with the beginning of the data signal on conductor 100 and coincident with the beginning of the data arrival signal on conductor 96 (FIGURE 1).

Capacitor S196 is 500 micromicrofarads. Resistor S198 is 470 kilohms, ½ watt, ±5%. Triode S202 is ½ of a type 5963; and plate resistor S204 is 100 kilohms, 1 watt, ±5%. All voltages shown are D.C.

The signal on conductor S206 triggers a first delay S4 which is adjusted to provide a 7 millisecond square wave on its output conductor S6. This 7 millisecond square wave on conductor S6 supplies the input to a differentiator S208 similar to differentiator S194. The differential negative pulse passes through an OR gate S210 comprising back-to-back diodes similar to OR gate S112. The negative output pulse from OR gate S210 is supplied on conductor S212 to a second delay S20 which is adjusted to provide a 5.5 millisecond square wave on conductor S22. The termination of the square wave on S22 triggers a third delay S24 which is also adjusted to provide a 5.5 millisecond square wave on its output conductor S26.

This signal is differentiated by differentiator S28 and supplied on input conductor S30 to an AND gate S32, known as the early gate. If the negative space insertion signal is present on conductor S36, and no positive signal is present on conductor S6, early gate S32 will produce an output pulse on conductor S34. Now since the total delay supplied by first delay S4, second delay S20, and third delay S24, which are all conected in series, is 18 milliseconds, it will be seen that the negative pulse on conductor S30 supplying early gate S32 will occur precisely 18 milliseconds after the beginning of the previous data signal on conductor 100. If another character is received by the central receiver-recorder at this time, first delay S4 will again be triggered and a positive signal will be present on conductor S6. This signal will inhibit early gate S32 and the pulse on conductor S30 will not pass through it. Furthermore, even if the second data signal on conductor 100 occurs up to 7 milliseconds early, the positive signal will be present on conductor S6, and the pulse on conductor S30 will not pass through early gate S32. Assuming that the second data signal has not occurred, the pulse will pass through early gate S32 and be present on output conductor S34.

The pulse will then trigger a fourth delay S40 which is adjusted to provide a 7 millisecond delay. A 7 millisecond square wave signal will then be present on conductor S42. This is differentiated by a differentiation circuit S44 to produce a negative pulse on conductor S46, 7 milliseconds after the negative pulse on conductor S34. This signal is supplied to a negative AND gate S48, known as the late gate. The second input of late gate S48 is also connected to output conductor S6 from first delay S4. If the 7 millisecond positive square wave is present on conductor S6, late gate S48 will be inhibited and the negative pulse on conductor S46 will not pass through late gate S48.

The negative pulse from conductor S46 will occur precisely 25 milliseconds after the initiating data signal on conductor 100. Assuming that a second character is received 18 milliseconds after the initiating data signal, the second data signal on conductor 100 will have triggered first delay S4 and the positive square wave will be present on conductor S6 inhibiting late gate S48. This will be true even if the second data signal on conductor 100 is up to 7 milliseconds late, that is, occurs up to 25 milliseconds after the previous data signal on conductor 100. Assuming that a second data signal does not occur on conductor 100 during the 7 milliseconds after a second character may be expected to arrive, the pulse on conductor S46 will pass through late gate S48 and be present on space conductor S50.

Reviewing the operation, then, of the early gate S32 and the late gate S48, the pulse on conductor S32 occurring precisely 18 milliseconds after the last data arrival signal will pass through early gate S32 if there is no second data arrival signal between 7 milliseconds before and until the expected occurrence of the next data arrival signal. The pulse will pass through late gate S48 if no data arrival signal occurs between its expected occurrence up until 7 milliseconds after its expected occurrence.

A space signal on conductor S50 will pass through negative OR gate S112 and if the character gate signal is present on conductor 40 will produce a positive input sync pulse on input sync conductor 80. This signal in the manner above described with reference to FIGURE 1 will cause a tape feed signal to be stored in storage I, a check bit to be stored in storage II when the tape feed signal is transferred to storage II. This will result in a check bit or space signal being recorded on the tape 82.

Space signal on conductor S50 will also pass through OR gate S210 and, in the manner described, result in the generation of another space signal on conductor S50, 18 milliseconds later. This will continue until termination of the space insertion signal on conductor S36. Spaces will thus be recorded on the tape whenever spaces occur in a message resulting from spaces in the special field 48 on data card 28 of FIGURE 1. For a more detailed description of the operation of my space generating regenerative loop, see my above-identified copending application, Serial No. 863,227.

SUMMARY

In summary, I have provided a data collection system wherein a plurality of data transmitters 20 connected to a data receiver-recorder 22 (FIGURE 1) transmit messages comprising characters recorded on punched cards and characters selected by means of variable dials 32. These messages are translated and recorded on punched tape 82 at the central receiver-recorder. The messages are checked for errors by comparing the number of characters recorded by the punch 74 with a length-of-message character provided by the data transmitters 20. However, in order to allow the number of characters actually recorded on some of the data cards, e.g. data card 28 of FIGURE 1a, to vary, a special field 48 is recorded thereon preceded by a start-of-field character 44 and concluded by an end-of-field character 46.

Character recognition circuits 98 are provided in the receiver-recorder (FIGURE 2) comprising a plurality of transfer switiches connected to data lines 60, novelly connected negative and positive gates C28 and C30 and an inverter amplifier C32. This novel character recognition circuit may be preset to recognize any desired character merely by setting its transfer switches.

Referring again to FIGURE 1, the character recognition circiuts 98 upon recognizing the preselected start-of-field character provide a start signal on start conductor 102 and upon recognizing the preselected end-of-field character, produce a stop signal on stop conductor 104. These signals are provided to a sync insertion unit 78 along with a data signal on conductor 100.

The sync insertion unit 78 (FIGURE 3) acting upon the initiation of the data signal on conductor 100 produces an input sync signal on input sync conductor 80. This signal controls the data flow control unit 68 so that characters translated by the translator 58 are set into storage I pass to storage II and then are recorded by the punch 74.

As the characters are transferred from storage I to storage II, a check bit insertion unit 84 monitoring the data lines 66 sets a check bit storage element in storage II whenever an even number of data bits occur in the character being transferred. No data bits is considered an even situation.

Again referring to FIGURE 3, a start signal on conductor 102 inhibits a gate S106 so that no input sync signal is supplied to input sync conductor 80 as a result of the receipt of the start-of-field character. The same is also true of a stop signal on stop conductor 104.

A start signal on conductor 102 sets a switch S152 so that a space insertion signal activates a regenerative loop circuit. This loop circuit then produces space pulses on conductor S50, each 18 milliseconds. These pulses result in an input sync signal on conductor 80. Through the operation of the check bit insertion unit 84 a check bit is thereupon recorded on the tape 82 whenever a space occurs in the message being transmitted.

If characters do occur in the special field 48 (FIGURE 1a) these characters will be recorded in the usual manner. A stop signal on conductor 104 or the end of the character gate signal in conductor 40 resets the switch 152 to discontinue the space insertion signal on conductor S36. This discontinues operation of the regenerative loop circuit.

Whenever the regenerative loop circuit of FIGURE 3 is not operating, if through error, no character is transmitted when one should be transmitted, e.g., in reading data cards, no check bit will be recorded on the tape 82. The character count supplied on conductor 90 to the length-of-message monitor unit 88 will disagree with the length-of-message signal sent by the transmitter transmitting at the end of a message. An error signal will then be produced on conductor 94.

It will thus be seen that the objects set forth above, among those made apparent from the preceding description, are efficiently attained and, since certain changes may be made in practicing the disclosed method of communication and in the apparatus set forth without departing from the scope of the invention, it is intended that all matter contained in the above description or shown in the accompanying drawings shall be interpreted as illustrative and not in a limiting sense. It is to be understood, for example, that while the preferred embodiment discloses a multiconductor communication cable as the inter-communicating link between transmitting stations and the central receiver-recorder, the invention is not so limited but may be employed with other suitable types of communication channels such as, but not limited to, multiple frequency carrier circuits over a common conductor, or radio frequency communication channels which may be either amplitude or frequency modulated. It is further to be understood that while the continuous medium record output disclosed herein is punched tape, the invention is equally applicable to magnetic tape, or to any form of record media. Whenever thermionic devices have been disclosed herein, it will be understood that equivalent electronic devices, including solid state devices such as transistors, may be substituted without departing from the invention.

It is also to be understood that the following claims are intended to cover all of the generic and specific features of the invention which, as a matter of language, might be said to fall herebetween. Particularly, it is to be understood that in said claims, elements recited in the singular are intended to include compatible combinations of equivalent elements wherever the sense permits.

Having described my invention, what I claim as new and desire to secure by Letters Patent is:

1. A data receiver for a data collection system wherein messages are transmitted, character by character, from at least one data transmitter to a data receiver, comprising in combination:
(A) first means responsive to receipt of a first predetermined character;
(B) generator means
   (a) controlled by said first means, and
   (b) generating space characters at a predetermined rate whenever spaces occur in a message being transmitted after receipt of said first predetermined character; and
(C) counting means
   (a) for counting the total number of characters received and generated, and
   (b) for generating an error signal if the number counted disagrees with a predetermined number.

2. In a data collection system comprising a plurality of data transmitters connected to a data receiver, error-detecting means comprising, in combination:
(A) means at each of said data transmitters for transmitting the characters recorded on data carriers;
(B) a plurality of data carriers,
   (a) each of said data carriers capable of carrying a fixed number of characters,
   (b) certain ones of said carriers having recorded thereon a lesser number of characters than they are capable of carrying,
   (c) the spaces thus resulting upon said carriers being confined to predetermined fields, and
   (d) a start-of-field character being recorded at the beginning of said predetermined fields;
(C) means at said data receiver for recognizing receipt of said start-of-field character;
(D) means at said data receiver for generating a synchronizing signal when each character is received from said data transmitters; and
(E) further means at said data receiver controlled by said character recognition means for generating said synchronizing signals at a predetermined rate after receipt of said start-of-field character.

3. The data collection system defined in claim 2, further defined in that:
(E) said further means includes means for inhibiting the generation of a synchronizing signal by said further means when a character is received.

4. The data collection system defined in claim 2, and
(F) means at said data receiver for inhibiting the generation of any synchronization signal when said start-of-field character is received.

5. The data collection system defined in claim 4, further defined in that:
(E) said further means includes means for inhibiting the generation of a synchronization signal by said further means when a character is received.

6. The data collection system defined in claim 2, further defined in that said means for recognizing receipt of said start-of-field character is connected to a plurality of data terminals, each capable of producing either of two voltage signals to indicate a character being received, and comprises in combination:
(A) a first OR gate
   (a) having a plurality of input terminals,
   (b) an output terminal, and
   (c) producing an output signal on said output terminal when any one of said input terminals is provided with a preselected one of said voltage signals;
(B) a second OR gate
   (a) having a plurality of input terminals,
   (b) an output terminal, and
   (c) producing an output signal on said output terminal when any one of said input terminals is provided with a preselected one of said voltage signals;
(C) means connected to the output terminal of said second OR gate
   (a) responsive to the output signal on said output terminal to provide an input signal to an input terminal of said first OR gate,
   (b) to which signal said OR gate is responsive to produce the said output signal on its output terminal; and
(D) a plurality of transfer switches, each having two switching positions,
   (a) each said transfer switch connected to a different one of the data terminals,
   (b) and each said switch in a first position connecting the data terminal connected thereto with a different one of the input terminals of said first OR gate,
   (c) and in a second position said switch connecting the data terminal connected thereto with a different one of the input terminals of said second OR gate,
   (d) the said OR gates thus connected to an individual data terminal responsive to opposite voltage signals at an individual data terminal to produce their respective output signals.

7. The data collection system defined in claim 2, wherein:
(B) on at least one of said data carriers
   (e) an end-of-field character is recorded at the end of said predetermined fields;
and further comprising:
(F) means at said data receiver for recognizing receipt of said end-of-field character, and
   (a) controlling said further means to stop generating said synchronizing signals.

8. The data collection system defined in claim 7, wherein said means for recognizing receipt of said end-of-field character is connected to a plurality of data terminals, each capable of producing either of two voltage signals to indicate a character being received, and comprises in combination:
(A) a first OR gate
   (a) having a plurality of input terminals,
   (b) an output terminal, and
   (c) producing an output signal on said output terminal when any one of said input terminals is provided with a preselected one of said voltage signals;
(B) a second OR gate
   (a) having a plurality of input terminals,
   (b) an output terminal, and
   (c) producing an output signal on said output terminal when any one of said input terminals is provided with a preselected one of said voltage signals;
(C) means connected to the output terminal of said second OR gate
   (a) responsive to the output signal on said output terminal to provide an input signal to an input terminal of said first OR gate,
   (b) to which signal said OR gate is responsive to produce the said output signal on its output terminal; and
(D) a plurality of transfer switches, each having two switching positions,
   (a) each said transfer switch connected to a different one of the data terminals,
   (b) and each said switch in a first position connecting the data terminal connected thereto with a different one of the input terminals of said first OR gate,
   (c) and in a second position said switch connecting the data terminal connected thereto with a different one of the input terminals of said second OR gate, (d) the said OR gates thus connected to an individual data terminal responsive to opposite voltage signals at an individual data terminal to produce their respective output signals.

9. The data collection system defined in claim 2 which further includes
  (F) means under the control of said further means for generating space characters in response to said synchronizing signals;
  (G) means at said data receiver for counting the received and generated characters; and
  (H) means at said data receiver for
    (1) comparing the total number of characters with a predetermined length-of-message number, and
    (2) generating an error signal if the length-of-message number and the total number of characters counted disagree.

10. The sytsem defined in claim 9, which further includes
  (I) means at said data transmitter for transmitting a character gating signal at preselected times when characters may be transmitted,
    (1) some of said special fields being located on said data carriers such that the termination thereof coincides with the termination of said character gating signal; and
  (J) means at said data receiver responsive to the termination of said character gating signal to terminate the operation of said space character generating means.

11. The system defined in claim 9 which further includes
  (I) means at said data transmitter for transmitting a message gating signal during the transmission of characters; and
  (J) means at said data receiver for terminating the operation of said space character generating means in response to the termination of said message gating signal.

12. The system defined in claim 11 which further includes
  (K) means at said data transmitter for transmitting a character gating signal at preselected times whenever characters may be transmitted,
    (1) some of said special fields being located on said data characters such that the termination thereof coincides with the termination of said character gating signal; and
  (L) means at said data transmitter responsive to the termination of said character gating signal for terminating the operation of said space character generating means.

13. A data receiver for a data collection system wherein messages are transmitted from at least one data transmitter to a data receiver, comprising in combination:
  (A) first means responsive to receipt of a first predetermined character;
  (B) generator means
    (a) controlled by said first means, and
    (b) generating space characters whenever spaces occur in a message being transmitted after receipt of said first predetermined character;
  (C) counting means
    (a) for counting the total number of characters received and generated, and
    (b) for generating an error signal if the number counted disagrees with a predetermined number;
  (D) second means responsive to receipt of a second predetermined character; and
  (E) said generator means further
    (c) controlled by said second means to discontinue generation of space characters after receipt of said second predetermined character.

14. A data receiver for a data collection system wherein mesasges are transmitted from at least one data transmitter to a data receiver together with a gating signal, comprising in combination:
  (A) first means responsive to receipt of a first predetermined character;
  (B) generator means
    (a) controlled by said first means, and
    (b) generating space characters whenever spaces occur in a message being transmitted after receipt of said first predetermined character;
  (C) counting means
    (a) for counting the total number of characters received, and
    (b) for generating an error signal if the number counted idsagrees with a predetermined number;
  (D) second means responsive to receipt of said gating signal; and
  (E) said generator means further
    (c) controlled by said second means to prevent generation of space characters when said gating signal is not being received.

15. A data receiver for a data collection system wherein messages are transmitted, character by character, from at least one data transmitter to a data receiver, comprising in combination:
  (A) first means responsive to receipt of a first predetermined character;
  (B) generator means
    (1) controlled by said first means, and
    (2) generating space characters at a predetermined rate whenever spaces occur in a message being transmitted after receipt of said first predetermined character;
  (C) counting means for counting the total number of characters received and generated; and
  (D) means at said data receiver for
    (1) comparing the total number of characters counted by said counting means with a predetermined length-of-message number received from said data transmitter, and
    (2) generating an error signal if the length-of-message number and the total number of characters counted disagree.

16. A data collection system comprising, in combination:
  (A) at least one data transmitter
    (1) adapted to transmit messages, character by character, and
    (2) adapted to transmit during a message a length-of-message number; and
  (B) a data receiver comprising, in combination:
    (1) first means responsive to receipt of a first predetermined character from said data transmitter,
    (2) generator means
      (a) controlled by said first means,
      (b) to generate space characters at a predetermined rate whenever spaces occur in a message being transmitted from said data transmitter after receipt of said first predetermined character;
  (C) counting means for counting the total number of characters received and generated; and
  (D) means at said data receiver for
    (1) comparing the total number of characters counted by said counting means with a predetermined length-of-message number received from said data transmitter, and
    (2) generating an error signal if the length-of-message number and the total number of characters counted disagree.

(References on following page)

References Cited by the Examiner

UNITED STATES PATENTS

| | | | |
|---|---|---|---|
| 2,860,325 | 11/1958 | Welsh et al. | |
| 3,038,031 | 6/1962 | Clark et al. | 340—146.1 X |
| 3,061,814 | 10/1962 | Crater | 340—146.1 |
| 3,065,457 | 11/1962 | Bailey et al. | 340—146.3 |
| 3,069,653 | 12/1962 | Hirshfield | 340—146.3 |
| 3,075,175 | 1/1963 | Lourie | 340—146.3 |
| 3,082,403 | 3/1963 | Silliman et all. | 340—146.3 X |
| 3,085,229 | 4/1963 | Blumenthal | 340—146.3 X |

ROBERT C. BAILEY, *Primary Examiner.*

MALCOLM A. MORRISON, *Examiner.*

M. P. ALLEN, E. M. RONEY, *Assistant Examiners.*